United States Patent
Hamanaka et al.

(10) Patent No.: US 11,817,266 B2
(45) Date of Patent: Nov. 14, 2023

(54) CONDUCTIVE PASTE AND CERAMIC ELECTRONIC COMPONENT

(71) Applicant: Murata Manufacturing Co., Ltd., Nagaokakyo (JP)

(72) Inventors: Kenichi Hamanaka, Nagaokakyo (JP); Kota Zenzai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 27 days.

(21) Appl. No.: 17/684,556

(22) Filed: Mar. 2, 2022

(65) Prior Publication Data
US 2022/0293345 A1   Sep. 15, 2022

(30) Foreign Application Priority Data
Mar. 12, 2021   (JP) ................ 2021-040739

(51) Int. Cl.
| | |
|---|---|
| H01G 4/232 | (2006.01) |
| H01B 1/22 | (2006.01) |
| C22C 9/06 | (2006.01) |
| B22F 1/103 | (2022.01) |
| B22F 1/17 | (2022.01) |
| H01G 4/30 | (2006.01) |

(52) U.S. Cl.
CPC .......... *H01G 4/2325* (2013.01); *B22F 1/103* (2022.01); *B22F 1/17* (2022.01); *C22C 9/06* (2013.01); *H01B 1/22* (2013.01); *B22F 2304/10* (2013.01); *H01G 4/30* (2013.01)

(58) Field of Classification Search
CPC ........ H01G 4/2325; H01G 4/30; B22F 1/103; B22F 1/17; B22F 2304/10; C22C 9/06; H01B 1/22

See application file for complete search history.

(56) References Cited

U.S. PATENT DOCUMENTS

| | | | | |
|---|---|---|---|---|
| 2007/0278907 | A1* | 12/2007 | Kondo | ............... H10N 30/871 29/25.35 |
| 2015/0184333 | A1* | 7/2015 | Arai | ..................... C08G 59/38 428/327 |

(Continued)

FOREIGN PATENT DOCUMENTS

| | | |
|---|---|---|
| JP | H0378906 A | 4/1991 |
| JP | 11-162771 A | 6/1999 |

(Continued)

OTHER PUBLICATIONS

Office Action in JP2021-040739, dated Sep. 12, 2023, 3 pages.

*Primary Examiner* — Michael P McFadden
(74) *Attorney, Agent, or Firm* — KEATING & BENNETT, LLP

(57) ABSTRACT

A conductive paste includes a conductive metal powder and a curable resin. The conductive metal powder includes Ag, Cu, and Ni. In the conductive metal powder, a mass ratio of Ag is about 3.0 wt % or more and about 10.0 wt % or less, a mass ratio of Cu is about {(1−mass ratio of Ag/100)×70} wt % or more and about {(1−mass ratio of Ag/100)×95} wt % or less, and a mass ratio of Ni is about {(1−mass ratio of Ag/100)×5} wt % or more and about {(1−mass ratio of Ag/100)×30} wt % or less.

15 Claims, 2 Drawing Sheets

(56) References Cited

U.S. PATENT DOCUMENTS

2016/0143145 A1* 5/2016 Inaba ................... H05K 3/3442
                                                    29/840
2022/0139864 A1* 5/2022 Nitta ....................... H01L 24/32
                                                    257/734

FOREIGN PATENT DOCUMENTS

JP    2018-104820 A    7/2018
JP    2020033610 A     3/2020

* cited by examiner

SECTIONAL VIEW TAKEN ALONG LINE II-II

CONDUCTIVE PASTE AND CERAMIC ELECTRONIC COMPONENT

CROSS REFERENCE TO RELATED APPLICATIONS

This application claims the benefit of priority to Japanese Patent Application No. 2021-040739 filed on Mar. 12, 2021. The entire contents of this application are hereby incorporated herein by reference.

BACKGROUND OF THE INVENTION

1. Field of the Invention

The present invention relates to a conductive paste and a ceramic electronic component, and particularly relates to a conductive paste which is used to provide an outer electrode of a ceramic electronic component and a ceramic electronic component including an outer electrode made using the conductive paste.

2. Description of the Related Art

In recent years, ceramic electronic components such as multilayer ceramic capacitors have been used in more severe environments than before.

For example, multilayer ceramic capacitors used in mobile devices, such as cellular phones and portable music players, need to withstand shocks due to dropping or the like. Specifically, even when multilayer ceramic capacitors are subjected to shocks due to dropping or the like, it is required that the multilayer ceramic capacitors do not fall off from mounting boards and cracks are prevented from occurring. Furthermore, multilayer ceramic capacitors used in vehicle-mounted devices, such as electronic control units (ECUs), need to withstand shocks due to thermal cycling or the like. Specifically, in a multilayer ceramic capacitor, when the flexural stress generated by linear expansion and contraction of a mounting board due to thermal cycling or the tensile stress applied on an outer electrode exceeds the strength of a multilayer body, cracks occur in the multilayer body. Therefore, even when multilayer ceramic capacitors are subjected to such stress, it is required that cracks are prevented from occurring.

In order to meet the requirements described above, for example, as described in Japanese Unexamined Patent Application Publication No. 11-162771, a technique has been proposed in which an outer electrode of a multilayer ceramic electronic component is configured to include a conductive resin layer formed using a thermosetting resin that contains a metal powder, and thus the stress applied from a mounting board is relaxed even in severe environments so that the occurrence of cracks in a multilayer body can be suppressed.

In fact, when stress is applied on a multilayer ceramic capacitor such as the one described in Japanese Unexamined Patent Application Publication No. 11-162771, the multilayer ceramic capacitor is generally designed such that by forming fracture cracks inside the conductive resin layer in the outer electrode, at the interface between the conductive resin layer and a plating layer, or at the interface between the conductive resin layer and the multilayer body, the stress applied on the multilayer ceramic capacitor is released, and the occurrence of cracks in the multilayer body is suppressed.

Furthermore, a conductive paste including a silver-coated alloy powder, as a conductive metal powder that can be used in such a conductive resin layer, has been proposed (refer to Japanese Unexamined Patent Application Publication No. 2018-104820).

In an environment where temperature changes are severe, for example, a multilayer ceramic capacitor having outer electrodes has a problem of ion migration (electrochemical migration). That is, dew condensation occurs on the surface of the multilayer ceramic capacitor due to a difference in temperature or a difference in heat capacity between the multilayer ceramic capacitor and the outside air. The water drops generated by the dew condensation form a water film connecting between the outer electrodes on the surface of the multilayer ceramic capacitor. When a voltage is applied between the outer electrodes of the multilayer ceramic capacitor in that state, the ionized metal species from the outer electrodes is dissolved/precipitated in the water film, and ion migration occurs.

However, in particular, in a multilayer ceramic capacitor, in the outer electrodes formed using the conductive paste according to Japanese Unexamined Patent Application Publication No. 2018-104820, it is difficult to suppress the occurrence of ion migration, and there is a concern that reliability of the multilayer ceramic capacitor cannot be maintained.

SUMMARY OF THE INVENTION

Preferred embodiments of the present invention provide conductive pastes each having good platability and each including an outer electrode having excellent migration resistance. Preferred embodiments of the present invention also provide ceramic electronic components each having excellent migration resistance and high reliability by using a conductive paste according to a preferred embodiment of the present invention.

A conductive paste according to a preferred embodiment of the present invention includes a conductive metal powder and a curable resin, in which the conductive metal powder includes Ag, Cu, and Ni, a mass ratio of Ag in the conductive metal powder is about 3.0 wt % or more and about 10.0 wt % or less, a mass ratio of Cu in the conductive metal powder is about $\{(1-\text{mass ratio of Ag}/100)\times 70\}$ wt % or more and about $\{(1-\text{mass ratio of Ag}/100)\times 95\}$ wt % or less, and a mass ratio of Ni in the conductive metal powder is about $\{(1-\text{mass ratio of Ag}/100)\times 5\}$ wt % or more and about $\{(1-\text{mass ratio of Ag}/100)\times 30\}$ wt % or less.

A ceramic electronic component according to a preferred embodiment of the present invention includes an outer electrode including a conductive resin layer including a conductive metal, the conductive metal includes Ag, Cu, and Ni, a mass ratio of Ag in the conductive metal is about 3.0 wt % or more and about 10.0 wt % or less, a mass ratio of Cu in the conductive metal is about 63 wt % or more and about 92.15 wt % or less, and a mass ratio of Ni in the conductive metal is about 4.5 wt % or more and about 29.1 wt % or less.

In a conductive metal powder included in a conductive paste according to a preferred embodiment of the present invention, the conductive metal powder includes Ag, Cu, and Ni, a mass ratio of Ag in the conductive metal powder is about 3.0 wt % or more and about 10.0 wt % or less, a mass ratio of Cu in the conductive metal powder is about $\{(1-\text{mass ratio of Ag}/100)\times 70\}$ wt % or more and about $\{(1-\text{mass ratio of Ag}/100)\times 95\}$ wt % or less, and a mass ratio of Ni in the conductive metal powder is about $\{(1-$ mass ratio of Ag/100)×5} wt % or more and about {(1−mass ratio of Ag/100)×30} wt % or less. Therefore, it is possible to obtain a conductive paste having good platability and excellent migration resistance.

Furthermore, a ceramic electronic component according to a preferred embodiment of present invention includes an outer electrode including a conductive resin layer including a conductive metal, the conductive metal includes Ag, Cu, and Ni, a mass ratio of Ag in the conductive metal is about 3.0 wt % or more and about 10.0 wt % or less, a mass ratio of Cu in the conductive metal is about 63 wt % or more and about 92.15 wt % or less, and a mass ratio of Ni in the conductive metal is about 4.5 wt % or more and about 29.1 wt % or less. Therefore, it is possible to obtain a ceramic electronic component having platability, excellent migration resistance, and high reliability.

According to preferred embodiments of the present invention, it is possible to obtain conductive pastes each having good platability and each including an outer electrode having excellent migration resistance.

Furthermore, by using conductive pastes according to preferred embodiments of the present invention, it is possible to obtain ceramic electronic components each having excellent migration resistance and high reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
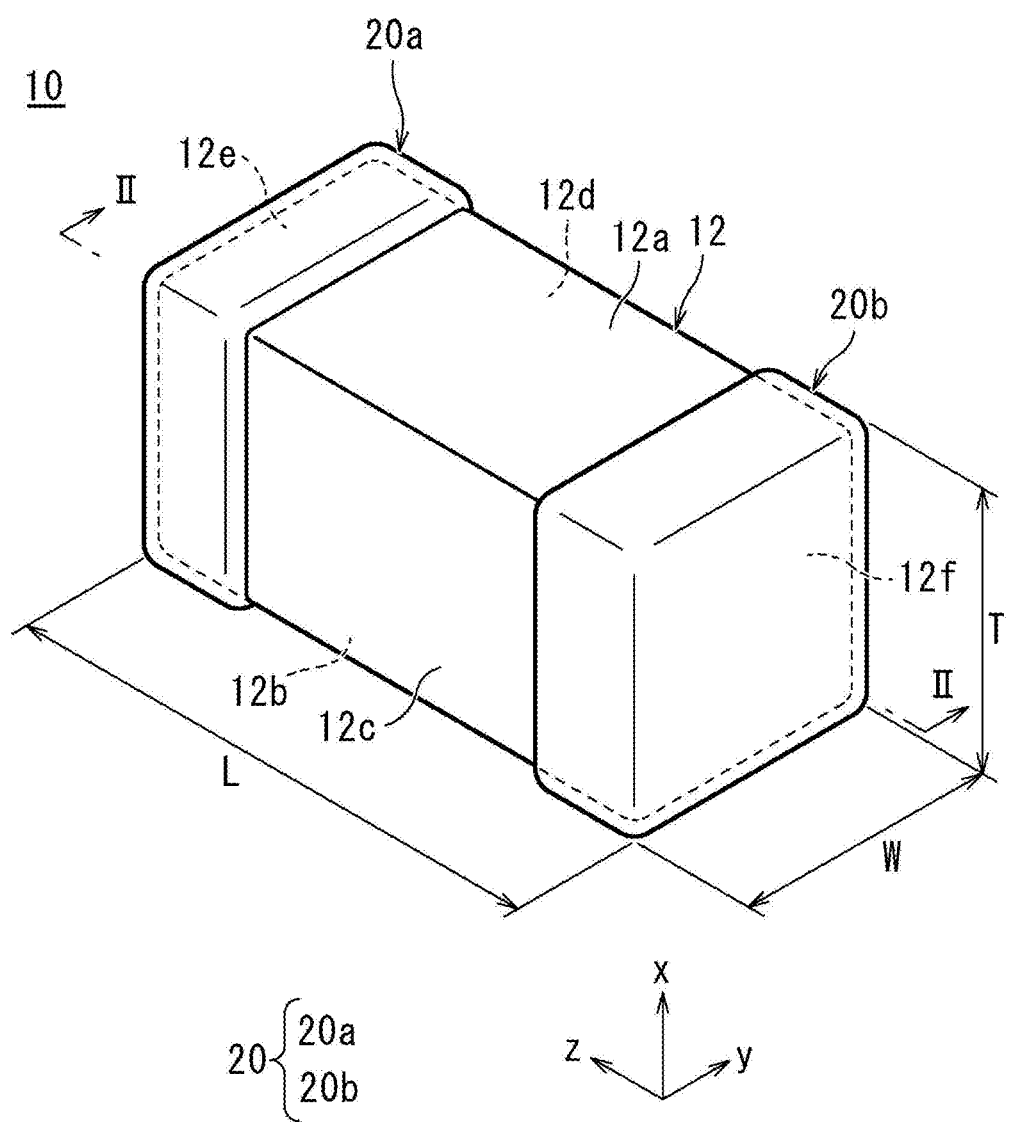
FIG. 1 is a perspective view showing a multilayer ceramic capacitor which is an example of a ceramic electronic component according to a preferred embodiment of the present invention.

Preferred embodiments of the present invention will be described below with reference to the drawings.

Conductive pastes according to preferred embodiments of the present invention and ceramic electronic components according to preferred embodiments of the present invention including an outer electrode provided using conductive pastes according to preferred embodiments of the present invention, together with a non-limiting examples of manufacturing methods thereof, will be described below. The ceramic electronic components may be, for example, a passive element, such as a multilayer ceramic capacitor or a multilayer ceramic inductor. In a preferred embodiment of the present invention, a multilayer ceramic capacitor, as an example of the ceramic electronic component, will be described.

1. Conductive Paste

A conductive paste according to a preferred embodiment of the present invention includes a conductive metal powder and a curable resin.

The conductive metal powder includes a CuNi alloy. The CuNi alloy is used as core particles, and a coating layer including Ag is disposed on a surface of each of the core particles.

The mass ratio of Ag in the conductive metal powder is, for example, about 3.0 wt % or more and about 10.0 wt % or less. Preferably, the mass ratio of Ag in the conductive metal powder is, for example, about 3.0 wt % or more and about 5.0 wt % or less.

The mass ratio of Cu in the conductive metal powder is about {(1−mass ratio of Ag/100)×70} wt % or more and about {(1−mass ratio of Ag/100)×95} wt % or less, for example. Preferably, the mass ratio of Cu in the conductive metal powder is about {(1−mass ratio of Ag/100)×70} wt % or more and about {(1−mass ratio of Ag/100)×90} wt % or less, for example. In other words, the mass ratio of Cu relative to the total of Cu and Ni (100 wt %) in the core particle of the CuNi alloy is about 70 wt % or more and about 95 wt % or less, for example. Preferably, the mass ratio of Cu is about 70 wt % or more and about 90 wt % or less, for example. Thus, it is possible to further improve migration resistance.

The mass ratio of Ni in the conductive metal powder is about {(1−mass ratio of Ag/100)×5} wt % or more and about {(1−mass ratio of Ag/100)×30} wt % or less, for example. Preferably, the mass ratio of Ni in the conductive metal powder is about {(1−mass ratio of Ag/100)×10} wt % or more and about {(1−mass ratio of Ag/100)×30} wt % or less, for example. In other words, the mass ratio of Ni relative to the total of Cu and Ni (100 wt %) in the core particle of the CuNi alloy is about 5 wt % or more and about 30 wt % or less, for example. Preferably, the mass ratio of Ni is about 10 wt % or more and about 30 wt % or less, for example. Thus, it is possible to further improve migration resistance.

The particle size corresponding to about 50% cumulative particle size distribution on a volume basis ($D_{50}$) of the conductive metal powder, measured with a laser diffraction particle size distribution measuring apparatus, is preferably about 0.1 μm or more and about 10.0 μm or less, for example.

The conductive metal powder includes, for example, core particles made of a CuNi alloy including Cu and Ni and a coating layer including Ag disposed on a surface of each of the core particles. The value obtained by dividing the oxygen content (wt %) of the conductive metal powder by the specific surface area S (m$^2$/g) is preferably about 1.5 wt %·g/m$^2$ or less, for example.

The specific surface area S is calculated from the formula (1):

$$\text{specific surface area } S = 6/(\rho \times D_{50}) \quad (1)$$

where ρ is the density (g/cm$^3$) calculated from the specific gravities of Ag, Cu, and Ni of the conductive metal powder and the composition ratio (the mass ratio of each of Ag, Cu, and Ni in the conductive metal powder when the total of Ag, Cu, and Ni is considered as 100 wt %), and $D_{50}$ is the particle size (μm) corresponding to about 50% cumulative particle size distribution on a volume basis obtained by measuring the conductive metal powder with a laser diffraction particle size distribution measuring apparatus.

Furthermore, the conductive metal powder may include, for example, Ag, Cu, and Ni so as to satisfy conditions that the mass ratio of Ag in the conductive metal powder is about 3.0 wt % or more and about 10.0 wt % or less, the mass ratio of Cu in the conductive metal powder is about {(1−mass ratio of Ag/100)×70} wt % or more and about {(1−mass ratio of Ag/100)×95} wt % or less, and the mass ratio of Ni in the conductive metal powder is about {(1−mass ratio of Ag/100)×5} wt % or more and about {(1−mass ratio of Ag/100)×30} wt % or less.

Preferably, the conductive metal powder may include, for example, Ag, Cu, and Ni so as to satisfy conditions that the mass ratio of Ag in the conductive metal powder is about 3.0 wt % or more and about 10.0 wt % or less, the mass ratio of Cu in the conductive metal powder is about {(1−mass ratio of Ag/100)×70} wt % or more and about {(1−mass ratio of Ag/100)×90} wt % or less, and the mass ratio of Ni in the conductive metal powder is about {(1−mass ratio of Ag/100)×10} wt % or more and about {(1−mass ratio of Ag/100)×30} wt % or less. Thus, it is possible to further improve migration resistance.

The curable resin included in the conductive paste is, for example, a thermosetting resin or a photocurable resin. As the thermosetting resin, for example, an epoxy resin or a phenoxy resin may be used. As the photocurable resin, for example, a photocurable resin that is cured by irradiation with ultraviolet light having a predetermined wavelength may be used.

The conductive paste further includes a curing agent, a curing accelerator, and a coupling agent. As the curing agent for an epoxy resin or a phenoxy resin, for example, a phenolic resin may be used. Furthermore, as the curing accelerator, for example, an imidazole-based curing accelerator or a tertiary amine-based curing accelerator may be used. As the coupling agent, for example, an epoxy silane may be used.

In the conductive paste according to the present preferred embodiment, the mass ratio of Ag in the conductive metal powder is about 3.0 wt % or more and about 10.0 wt % or less, the mass ratio of Cu in the conductive metal powder is about {(1−mass ratio of Ag/100)×70} wt % or more and about {(1−mass ratio of Ag/100)×95} wt % or less, and the mass ratio of Ni in the conductive metal powder is about {(1−mass ratio of Ag/100)×5} wt % or more and about {(1−mass ratio of Ag/100)×30} wt % or less. Therefore, it is possible to obtain a conductive paste having good platability and capable of forming an outer electrode having excellent migration resistance.

2. Multilayer Ceramic Capacitor

A description will be provided below on a multilayer ceramic capacitor as an example of a ceramic electronic component including an outer electrode provided using a conductive paste according to a preferred embodiment of the present invention.

Figure 2:
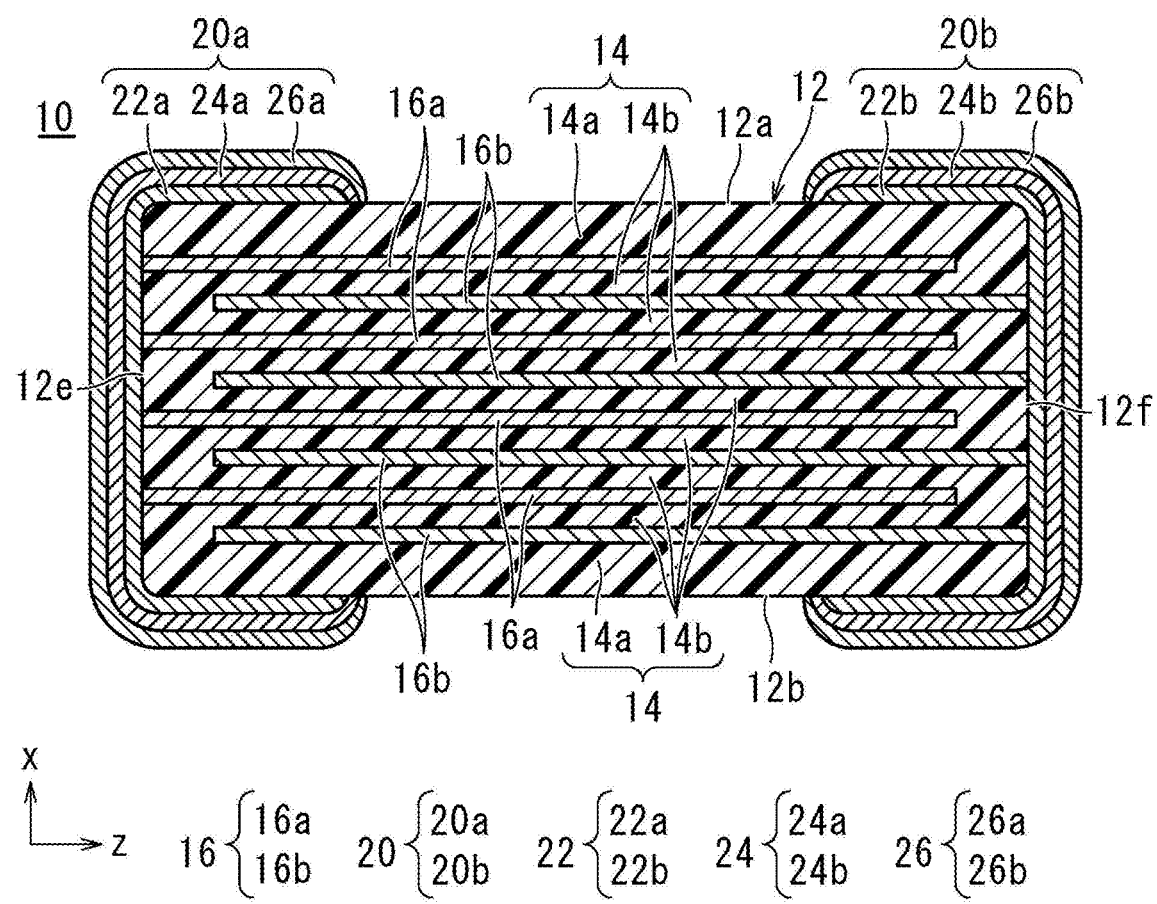
FIG. 2 is a sectional view taken along the line II-II of FIG. 1.

FIG. 1 is a perspective view showing a multilayer ceramic capacitor which is an example of a ceramic electronic component according to a preferred embodiment of the present invention. FIG. 2 is a sectional view taken along the line II-II of FIG. 1.

As shown in FIG. 1, a multilayer ceramic capacitor 10 includes a multilayer body 12 having a rectangular or substantially rectangular parallelepiped shape.

The multilayer body 12 includes a plurality of dielectric layers 14 and a plurality of inner electrode layers 16 which are stacked together. Furthermore, the multilayer body 12 includes a first principal surface 12a and a second principal surface 12b which are opposite to each other in the height direction x, a first side surface 12c and a second side surface 12d which are opposite to each other in the width direction y orthogonal or substantially orthogonal to the height direction x, and a first end surface 12e and a second end surface 12f which are opposite to each other in the length direction z orthogonal or substantially orthogonal to the height direction x and the width direction y. In the multilayer body 12, corner portions and ridge portions are rounded. The term "corner portion" refers to a portion at which adjacent three surfaces of the multilayer body intersect, and the term "ridge portion" refers to a portion at which adjacent two surfaces of the multilayer body intersect.

The multilayer body 12 includes outer layer portions 14a including a plurality of dielectric layers 14 and inner layer portions 14b including a plurality of dielectric layers 14 and a plurality of inner electrode layers 16 provided thereon. The outer layer portions 14a are located on the first principal surface 12a side and the second principal surface 12b side of the multilayer body 12, and include a plurality of dielectric layers 14 located between the first principal surface 12a and an inner electrode layer 16 closest to the first principal surface 12a and a plurality of dielectric layers 14 located between the second principal surface 12b and an inner electrode layer 16 closest to the second principal surface 12b. A region sandwiched between both outer layer portions 14a corresponds to the inner layer portions 14b.

The dielectric layer 14 can be made of, for example, a dielectric material. As the dielectric material, for example, a dielectric ceramic including a component, such as $BaTiO_3$, $CaTiO_3$, $SrTiO_3$, or $CaZrO_3$, can be used. In the case where the dielectric layer 14 includes the dielectric material described above as a main component, depending on the desired characteristics of the multilayer body 12, it may also possible to use a material obtained by adding thereto a secondary component, such as, for example, a Mn compound, an Fe compound, a Cr compound, a Co compound, or a Ni compound, with a lower content than that of the main component.

The multilayer body 12 includes, as the plurality of inner electrode layers 16, a plurality of first inner electrode layers 16a and a plurality of second inner electrode layers 16b which are, for example, rectangular or substantially rectangular. The plurality of first inner electrode layers 16a and the plurality of second inner electrode layers 16b are buried so as to be alternately provided at regular intervals along the height direction x of the multilayer body 12.

Each of the first inner electrode layers 16a faces a corresponding one of the second inner electrode layers 16b with a dielectric layer 14 interposed therebetween, and an end portion thereof extends to and is exposed at the first end surface 12e. Each of the second inner electrode layers 16b faces a corresponding one of the first inner electrode layers 16a with a dielectric layer 14 interposed therebetween, and an end portion thereof extends to and is exposed at the second end surface 12f.

The inner electrode layer 16 includes an appropriate conductive material, for example, a metal such as Ni, Cu, Ag, Pd, or Au, or an alloy including at least one of these metals such as an Ag—Pd alloy. As a resin component used in a conductive paste for inner electrode to provide the inner electrode layer 16, for example, ethyl cellulose or an acrylic resin is preferably used.

Outer electrodes 20 are disposed on the first end surface 12e side and the second end surface 12f side of the multilayer body 12. The outer electrodes 20 include a first outer electrode 20a and a second outer electrode 20b.

The first outer electrode 20a is provided on the first end surface 12e of the multilayer body 12 and extends from the first end surface 12e and covers a portion of each of the first principal surface 12a, the second principal surface 12b, the first side surface 12c, and the second side surface 12d. In this case, the first outer electrode 20a is electrically connected to the first inner electrode layers 16a.

The second outer electrode 20b is provided on the second end surface 12f of the multilayer body 12 and extends from the second end surface 12f and covers a portion of each of the first principal surface 12a, the second principal surface 12b, the first side surface 12c, and the second side surface 12d. In this case, the second outer electrode 20b is electrically connected to the second inner electrode layers 16b.

In the multilayer body 12, each of the first inner electrode layers 16a faces a corresponding one of the second inner electrode layers 16b with a dielectric layer 14 interposed therebetween, thus producing electrostatic capacitance. Accordingly, electrostatic capacitance can be obtained between the first outer electrode 20a to which the first inner electrode layers 16a are connected and the second outer electrode 20b to which the second inner electrode layers 16b are connected, and thus characteristics of a capacitor are obtained.

The first outer electrode 20a and the second outer electrode 20b each include an underlying electrode layer 22 which includes a conductive metal and a glass component, a conductive resin layer 24 which covers the underlying electrode layer 22 and includes a curable resin and a conductive metal powder, and a plating layer 26 covering the conductive resin layer 24.

The underlying electrode layers 22 include a first underlying electrode layer 22a and a second underlying electrode layer 22b.

The first underlying electrode layer 22a is provided on the first end surface 12e of the multilayer body 12 and extends from the first end surface 12e and covers a portion of each of the first principal surface 12a, the second principal surface 12b, the first side surface 12c, and the second side surface 12d.

The second underlying electrode layer 22b is provided on the second end surface 12f of the multilayer body 12 and extends from the second end surface 12f and covers a portion of each of the first principal surface 12a, the second principal surface 12b, the first side surface 12c, and the second side surface 12d.

The underlying electrode layer 22 includes a conductive metal and a glass component. The conductive metal of the underlying electrode layer 22 includes, for example, at least one selected from the group consisting of Cu, Ni, Ag, Pd, a Ag—Pd alloy, and Au. The glass of the underlying electrode layer 22 includes, for example, at least one selected from the group consisting of B, Si, Ba, Mg, Al, and Li. The underlying electrode layer 22 may include a plurality of layers. The underlying electrode layer 22 is obtained by applying a conductive paste including a glass and a metal to the multilayer body 12, followed by baking. The underlying electrode layer 22 may be obtained by co-firing with the dielectric layers 14 and the inner electrode layers 16, or may be obtained by baking after firing the dielectric layers 14 and the inner electrode layers 16. A dielectric material may be used instead of the glass. In the case where a dielectric material is used instead of the glass, the underlying electrode layer 22 is preferably co-fired with the dielectric layers 14 and the inner electrode layers 16.

The conductive resin layers 24 include a first conductive resin layer 24a and a second conductive resin layer 24b.

The first conductive resin layer 24a covers the first underlying electrode layer 22a. Specifically, preferably the first conductive resin layer 24a is provided on the surface of the first underlying electrode layer 22a at the first end surface 12e and extends over the surface of the first underlying electrode layer 22a at the first principal surface 12a, the second principal surface 12b, the first side surface 12c, and the second side surface 12d.

The second conductive resin layer 24b covers the second underlying electrode layer 22b. Specifically, preferably the second conductive resin layer 24b is provided on the surface of the second underlying electrode layer 22b at the second end surface 12f and extends over the surface of the second underlying electrode layer 22b at the first principal surface 12a, the second principal surface 12b, the first side surface 12c, and the second side surface 12d.

The conductive resin layer 24 includes a conductive metal and a curable resin.

The conductive resin layer 24 includes a curable resin and therefore is more flexible than, for example, a conductive layer made of a plating film or a fired product of a conductive paste. Accordingly, even when a physical shock or a shock due to thermal cycling is applied to the multilayer ceramic capacitor 10, the conductive resin layer 24 defines and functions as a buffer layer and prevents cracks from occurring in the multilayer ceramic capacitor 10.

As the conductive metal included in the conductive resin layer 24, a conductive metal powder is used. The conductive metal powder is coated with Ag, and a CuNi alloy is used as core particles, for example.

The mass ratio of Ag in the conductive metal is about 3.0 wt % or more and about 10.0 wt % or less, for example. Preferably, the mass ratio of Ag in the conductive metal powder is about 3.0 wt % or more and about 5.0 wt % or less, for example.

The mass ratio of Cu in the conductive metal is about 63 wt % or more and about 92.15 wt % or less, for example. Preferably, the mass ratio of Cu in the conductive metal is about 85.5 wt % or more and about 92.15 wt % or less, for example. In other words, the mass ratio of Cu relative to the total of Cu and Ni (100 wt %) in the core particle of the CuNi alloy is about 70 wt % or more and about 95 wt % or less, for example. Preferably, the mass ratio of Cu is about 70 wt % or more and about 90 wt % or less, for example. Thus, it is possible to further improve migration resistance.

The mass ratio of Ni in the conductive metal is about 4.5 wt % or more and about 29.1 wt % or less, for example. Preferably, the mass ratio of Ni in the conductive metal is about 9.5 wt % or more and about 29.1 wt % or less, for example. In other words, the mass ratio of Ni relative to the total of Cu and Ni (100 wt %) in the core particle of the CuNi alloy is about 5 wt % or more and about 30 wt % or less, for example. Preferably, the mass ratio of Ni is about 10 wt % or more and about 30 wt % or less, for example. Thus, it is possible to further improve migration resistance.

Furthermore, it is preferable to use a metal coated with Ag as the conductive metal included in the conductive resin layer because Ag, which has the lowest specific resistance among metals, is suitable as an electrode material, Ag, which is a noble metal, is not oxidized and has high weather resistance, and by using Ag coating, it is possible to use an inexpensive metal for core particles.

The conductive metal included in the conductive resin layer 24 mainly ensures the conductivity of the conductive resin layer 24. Specifically, particles of the conductive filler are brought into contact with each other to provide conductive paths in the conductive resin layer 24.

The curable resin of the conductive resin layer 24 is a thermosetting resin or a photocurable resin. As the thermosetting resin, for example, an epoxy resin or a phenoxy resin may be used. As the photocurable resin, for example, a photocurable resin that is cured by irradiation with ultraviolet light having a predetermined wavelength may be used.

The conductive paste further includes a curing agent, a curing accelerator, and a coupling agent. As the curing agent for an epoxy resin or a phenoxy resin, for example, a phenolic resin may be used. Among these, the epoxy resin having excellent heat resistance, moisture resistance, and adhesion properties is one of preferable resins. Furthermore, as the curing accelerator, for example, an imidazole-based curing accelerator or a tertiary amine-based curing accelerator may be used. As the coupling agent, for example, an epoxy silane may be used.

The plating layers 26 include a first plating layer 26a and a second plating layer 26b.

The first plating layer 26a covers the first conductive resin layer 24a. Specifically, preferably the first plating layer 26a is provided on the surface of the first conductive resin layer 24a at the first end surface 12e and extends over the surface of the first conductive resin layer 24a at the first principal surface 12a, the second principal surface 12b, the first side surface 12c, and the second side surface 12d.

The second plating layer 26b covers the second conductive resin layer 24b. Specifically, preferably the second plating layer 26b is provided on the surface of the second conductive resin layer 24b at the second end surface 12f and extends over the surface of the second conductive resin layer 24b at the first principal surface 12a, the second principal surface 12b, the first side surface 12c, and the second side surface 12d.

The plating layer 26 includes, for example, at least one selected from the group consisting of Cu, Ni, Sn, Ag, Pd, a Ag—Pd alloy, and Au.

The plating layer 26 may include a plurality of layers. In this case, the plating layer 26 preferably has a two-layer structure including a Ni plating layer and a Sn plating layer, for example. By providing the Ni plating layer covering the surface of the conductive resin layer 24, a solder barrier property is obtained. Furthermore, by providing the Sn plating layer on the surface of the Ni plating layer, the wettability of the solder used to mount the multilayer ceramic capacitor 10 is improved, thus facilitating mounting.

According to the multilayer ceramic capacitor 10 having the structure described above, in the conductive paste for forming the conductive resin layer 24, the mass ratio of Ag in the conductive metal powder is about 3.0 wt % or more and about 10.0 wt % or less, the mass ratio of Cu in the conductive metal powder is about 63 wt % or more and about 92.15 wt % or less, and the mass ratio of Ni in the conductive metal powder is about 4.5 wt % or more and about 29.1 wt % or less. Accordingly, the outer electrode 20 is provided using the conductive paste having good platability and capable of providing the outer electrode 20 having excellent migration resistance, and the conductive resin layer 24 has good platability and excellent migration resistance. Therefore, when the conductive resin layer 24 of the outer electrode 20 of the multilayer ceramic capacitor 10 is provided, by using a conductive paste according to a preferred embodiment of the present invention, it is possible to obtain a multilayer ceramic capacitor 10 having good platability, excellent migration resistance, and high reliability.

3. Method of Manufacturing Multilayer Ceramic Capacitor

A non-limiting example of a method of manufacturing the multilayer ceramic capacitor 10 will now be described.

Production of Ceramic Green Sheets

First, as a dielectric material, a perovskite oxide including, for example, as a main component $BaTiO_3$, $CaTiO_3$, $SrTiO_3$, $CaZrO_3$, or the like is prepared. By mixing an organic binder, an organic solvent, a plasticizer, and a dispersant into a dielectric powder obtained from the dielectric material in predetermined proportions, a ceramic slurry is produced. The ceramic slurry is formed into ceramic green sheets for inner layer or for outer layer on a resin film.

Next, a conductive paste for forming an inner electrode is prepared. The conductive paste for forming an inner electrode is applied onto the ceramic green sheet in a predetermined pattern, for example, by screen printing or gravure printing. Thus, a ceramic green sheet for inner layer on which a conductive pattern for forming an inner electrode has been formed, and a ceramic green sheet for outer layer on which a conductive pattern for forming an inner electrode is not formed are prepared.

The ceramic paste and the conductive paste for forming an inner electrode may include, for example, a known organic binder and a known solvent. Furthermore, the conductive paste for forming an inner electrode is, for example, obtained by adding an organic binder and an organic solvent to a metal powder.

Next, a plurality of ceramic green sheets for inner layer are stacked such that end portions of the conductive paste films extend in alternate directions. Ceramic green sheets for outer layer are further stacked on the upper and lower sides so as to sandwich the ceramic green sheets for inner layer which have been stacked. That is, a plurality of ceramic green sheets for outer layer formed of the same material as that of the ceramic green sheets for inner layer are stacked so as to achieve a predetermined thickness and pressure bonding is performed. Thus, a multilayer block is formed. The multilayer block is cut into a predetermined product size, and a green multilayer body 12 is obtained.

The resulting green multilayer body 12 is fired to produce a sintered multilayer body 12.

The ceramic green sheets for inner layer and for outer layer and the conductive paste films are co-fired. The ceramic green sheets for inner layer define inner layer portions 14b, the ceramic green sheets for outer layer define outer layer portions 14a, and the conductive paste films define inner electrode layers 16.

Production of Conductive Paste

Next, a conductive paste for forming an underlying electrode layer of an outer electrode and a conductive paste for forming a conductive resin layer are prepared.

First, in order to form an underlying electrode layer, a conductive paste including, for example, a metal component mainly including Cu and a glass component is prepared.

Next, in order to prepare a conductive paste for forming a conductive resin layer of an outer electrode, a conductive metal powder including, for example, a Ag powder and a CuNi alloy powder which is used as core particles, a curable resin, a curing agent, a curing accelerator, and a coupling agent are prepared.

In the conductive metal powder, for example, the CuNi alloy is used as core particles, and a coating layer including Ag is disposed on a surface of each of the core particles.

The mass ratio of Ag in the conductive metal powder is about 3.0 wt % or more and about 10.0 wt % or less, for example. Preferably, the mass ratio of Ag in the conductive metal powder is about 3.0 wt % or more and about 5.0 wt % or less, for example.

The mass ratio of Cu in the conductive metal powder is about {(1−mass ratio of Ag/100)×70} wt % or more and about {(1−mass ratio of Ag/100)×95} wt % or less, for example. Preferably, the mass ratio of Cu in the conductive metal powder is about {(1−mass ratio of Ag/100)×70} wt % or more and about {(1−mass ratio of Ag/100)×90} wt % or less, for example. In other words, the mass ratio of Cu relative to the total of Cu and Ni (100 wt %) in the core particle of the CuNi alloy is about 70 wt % or more and about 95 wt % or less, for example. Preferably, the mass ratio of Cu is about 70 wt % or more and about 90 wt % or less, for example.

The mass ratio of Ni in the conductive metal powder is about {(1−mass ratio of Ag/100)×5} wt % or more and about {(1−mass ratio of Ag/100)×30} wt % or less, for example. Preferably, the mass ratio of Ni in the conductive metal powder is about {(1−mass ratio of Ag/100)×10} wt % or more and about {(1−mass ratio of Ag/100)×30} wt % or less, for example. In other words, the mass ratio of Ni relative to the total of Cu and Ni (100 wt %) in the core particle of the CuNi alloy is about 5 wt % or more and about 30 wt % or less, for example. Preferably, the mass ratio of Ni is about 10 wt % or more and about 30 wt % or less, for example.

The particle size corresponding to about 50% cumulative particle size distribution on a volume basis ($D_{50}$) of the conductive metal powder, measured with a laser diffraction particle size distribution measuring apparatus, is preferably about 0.1 μm or more and about 10.0 μm or less, for example.

The conductive metal powder includes core particles formed of, for example, a CuNi alloy including Cu and Ni and a coating layer including Ag disposed on a surface of each of the core particles. The value obtained by dividing the oxygen content (wt %) of the conductive metal powder by the specific surface area S ($m^2$/g) is preferably about 1.5 wt %·g/$m^2$ or less.

The curable resin included in the conductive paste is a thermosetting resin or a photocurable resin. As the thermosetting resin, for example, an epoxy resin or a phenoxy resin may be used. As the photocurable resin, for example, a photocurable resin that is cured by irradiation with ultraviolet light having a predetermined wavelength may be used.

The conductive paste further includes a curing agent, a curing accelerator, and a coupling agent. As the curing agent for an epoxy resin or a phenoxy resin, for example, a phenolic resin may be used. Furthermore, as the curing accelerator, for example, an imidazole-based curing accelerator or a tertiary amine-based curing accelerator may be used. As the coupling agent, for example, an epoxy silane may be used.

The materials described above, i.e., the conductive metal powder, the curable resin, the curing agent, the curing accelerator, and the coupling agent, are mixed to produce a conductive paste.

Formation of Outer Electrode

Next, outer electrodes 20 are formed on both end portions of the sintered multilayer body 12 using the conductive pastes.

First, the conductive paste for underlying electrode mainly including Cu is applied to both end portions of the multilayer body 12, followed by baking to form underlying electrode layers 22 which are electrically connected to the inner electrode layers 16.

Subsequently, a conductive paste according to a preferred embodiment of the present invention is applied to the surfaces of the underlying electrode layers 22, followed by baking to form conductive resin layers 24 so as to cover the underlying electrode layers 22.

Furthermore, plating layers 26 are formed on the surfaces of the conductive resin layers 24 by performing Ni plating and Sn plating, for example.

In this way, a desired multilayer ceramic capacitor 10 is produced.

4. Experimental Example 1

Multilayer ceramic capacitors as samples were produced in accordance with the non-limiting example of a method of manufacturing a multilayer ceramic capacitor described above. Experiments were performed on each sample to evaluate the platability of the conductive resin layer made of the conductive paste produced using the materials shown in Table 1, and the migration occurrence rate and the rate of change in electrical characteristics of the multilayer ceramic capacitor having the outer electrode including the conductive resin layer.

(a) Sample Used in Experimental Example 1

The specifications of the multilayer ceramic capacitor as the sample used in the Experimental Example are as follows:

Size of multilayer ceramic capacitor (design value): length×width×height=about 1.0 mm×about 0.5 mm×about 0.5 mm Capacitance: about 0.01 μF Rated voltage: about 50 V Material of dielectric layer: $BaTiO_3$ Structure of outer electrode Material of underlying electrode layer: electrode containing conductive metal (Cu) and glass Material of conductive resin layer: refer to Table 1

Plating layer: two-layer structure including Ni plating layer and Sn plating layer The $D_{50}$ of the conductive metal powder included in the conductive paste of the conductive resin layer in each sample was in the range of about 1.5 μm to about 5.5 μm. Furthermore, the specific surface area of the conductive metal powder included in the conductive paste of the conductive resin layer in each sample was about 0.30 wt %·g/$m^2$ or more and about 0.55 wt %·g/$m^2$ or less.

Table 1 shows the mass ratio of the metal component included in the conductive metal powder, the mass ratio relative to the total of Cu and Ni (100 wt %) in the core particle of a CuNi alloy, and materials of the thermosetting resin in each sample. In the thermosetting resin in each sample, the base resin, the curing agent, the curing accelerator, and the coupling agent are shown. Note that the samples of asterisked sample numbers are within the ranges of preferred embodiments of the present invention.

TABLE 1

| Sample No. | Metal component | | | | | Thermosetting resin | | | |
|---|---|---|---|---|---|---|---|---|---|
| | Mass ratio in conductive metal (wt %) | | | Mass ratio relative to total of Cu and Ni (100 wt %) in core particle of CuNi alloy (wt %) | | Base resin | Curing agent | Curing accelerator | Coupling agent |
| | Ag | Cu | Ni | Cu | NI | | | | |
| 1 | 100 | — | — | — | — | Epoxy resin | Phenolic resin | Imidazole | Epoxy silane |
| 2 | 20 | 80.00 | — | 100 | — | Epoxy resin | Phenolic resin | Imidazole | Epoxy silane |
| 3 | 10 | 90.00 | — | 100 | — | Epoxy resin | Phenolic resin | Imidazole | Epoxy silane |
| 4 | 20 | 76.00 | 4.00 | 95 | 5 | Epoxy resin | Phenolic resin | Imidazole | Epoxy silane |
| 5 | 20 | 56.00 | 24.00 | 70 | 30 | Epoxy resin | Phenolic resin | Imidazole | Epoxy silane |
| * 6 | 10 | 85.50 | 4.50 | 95 | 5 | Epoxy resin | Phenolic resin | Imidazole | Epoxy silane |
| * 7 | 10 | 81.00 | 9.00 | 90 | 10 | Epoxy resin | Phenolic resin | Imidazole | Epoxy silane |
| * 8 | 10 | 63.00 | 27.00 | 70 | 30 | Epoxy resin | Phenolic resin | Imidazole | Epoxy silane |
| * 9 | 3 | 92.15 | 4.85 | 95 | 5 | Epoxy resin | Phenolic resin | Imidazole | Epoxy silane |
| * 10 | 3 | 87.30 | 9.70 | 90 | 10 | Epoxy resin | Phenolic resin | Imidazole | Epoxy silane |
| * 11 | 3 | 67.90 | 29.10 | 70 | 30 | Epoxy resin | Phenolic resin | Imidazole | Epoxy silane |
| 12 | 1 | 94.05 | 4.95 | 95 | 5 | Epoxy resin | Phenolic resin | Imidazole | Epoxy silane |
| 13 | 1 | 89.10 | 9.90 | 90 | 10 | Epoxy resin | Phenolic resin | Imidazole | Epoxy silane |
| 14 | 1 | 69.30 | 29.70 | 70 | 30 | Epoxy resin | Phenolic resin | Imidazole | Epoxy silane |

(b) Evaluation Methods for Characteristics of Each Sample
Evaluation Method for Platability The platability was evaluated by forming a Ni plating film on the surface of the conductive resin layer. Specifically, in the case where a Ni plating film was formed on about 90% or more of the surface area of the conductive resin layer, the sample was evaluated as good, and in the case where a Ni plating film was formed on less than about 90% of the surface area of the conductive resin layer, the sample was evaluated as poor.

Migration Occurrence Rate

In the evaluation of the migration occurrence state, after a sample (multilayer ceramic capacitor) was mounted on a substrate, the sample was subjected to a high temperature loading test 1 in which with a voltage of about 1.5 WV being applied between outer electrodes at about 125° C., the sample was held for about 2,000 hours and a high temperature loading test 2 in which with a voltage of about 0.75 WV being applied between outer electrodes at about 150° C., the sample was held for about 2,000 hours. Then, the migration occurrence state on the surface of the sample was observed with a digital microscope. Based on the relationship between the number of samples in which occurrence of Ag migration was observed and the number of samples subjected to evaluation, the migration occurrence rate was obtained from the formula (2) below.

Migration occurrence rate (%) = (number of samples in which occurrence of Ag migration was observed/number of samples subjected to evaluation) × 100    (2)

Evaluation Method for Rate of Change in Electrical Characteristics

A liquid phase thermal shock cycling test was conducted on the samples, and the rate of change in electrical characteristics was evaluated. In the liquid phase thermal shock cycling test, 1,000 cycles were performed with one cycle consisting of holding for about 5 minutes at a temperature of about −55° C. and holding for about 5 minutes at a temperature of about 125° C. The sample in which the rate of increase in equivalent series resistance (ESR) was about 20% or less was evaluated as good, and the sample in which the rate of increase in ESR was more than about 20% was evaluated as poor.

(c) Results of Characteristics Evaluation on Each Sample

Table 2 shows the migration occurrence rate, the platability, and the rate of change in electrical characteristics in each sample. Note that the samples of asterisked sample numbers are within the ranges of preferred embodiments of the present invention.

TABLE 2

| Sample No. | Migration occurrence rate | | Platability (%) | Rate of change in electrical characteristics (%) |
|---|---|---|---|---|
| | High temperature loading test 1 | High temperature loading test 2 | | |
| 1 | 100.0 | 100.0 | 99.8 | 2.8 |
| 2 | 0.0 | 2.5 | 99.8 | 2.0 |
| 3 | 0.0 | 1.2 | 99.2 | 1.8 |
| 4 | 0.0 | 2.0 | 99.0 | 3.0 |
| 5 | 0.0 | 3.0 | 98.8 | 3.1 |
| * 6 | 0.0 | 0.0 | 98.3 | 2.5 |
| * 7 | 0.0 | 0.0 | 98.2 | 2.7 |
| * 8 | 0.0 | 0.0 | 97.9 | 4.1 |
| * 9 | 0.0 | 0.0 | 97.8 | 3.2 |
| * 10 | 0.0 | 0.0 | 97.3 | 2.9 |
| * 11 | 0.0 | 0.0 | 97.0 | 5.4 |
| 12 | 0.0 | 0.0 | 95.0 | 23.0 |
| 13 | 0.0 | 0.0 | 94.6 | 28.0 |
| 14 | 0.0 | 0.0 | 94.0 | 35.0 |

As confirmed from Tables 1 and 2, in the samples in which the conductive resin layers were formed using the conductive pastes with the mass ratios of the metal component of sample Nos. 6 to 11, which were within the ranges of preferred embodiments of the present invention, no migration occurrence was observed, the platability was about 90% or more which was evaluated as good, and the rate of change in electrical characteristics was about 20% or less which was evaluated as good.

On the other hand, regarding the samples outside the ranges of preferred embodiments of the present invention, in the sample in which the conductive resin layer was formed using the conductive paste with the mass ratio of the metal component of sample No. 1, the mass ratio of Ag was outside the ranges of preferred embodiments of the present invention, and the metal component did not include Cu and Ni, in the sample in which the conductive resin layer was formed using the conductive paste with the mass ratio of the metal component of sample No. 2, the mass ratio of Ag was outside the ranges of preferred embodiments of the present invention, and the metal component did not include Ni, in the sample in which the conductive resin layer was formed using the conductive paste with the mass ratio of the metal component of sample No. 3, the metal component did not include Ni; and in the samples in which the conductive resin layers were formed using the conductive pastes with the mass ratios of the metal component of sample Nos. 4 and 5, the mass ratio of Ag was outside the ranges of preferred embodiments of the present invention. Therefore, migration occurred.

Furthermore, in the samples in which the conductive resin layers were formed using the conductive pastes with the mass ratios of the metal component of sample Nos. 12 to 14, which were outside the ranges of preferred embodiments of the present invention, since the mass ratio of Ag was outside the ranges of preferred embodiments of the present invention, the rate of change in electrical characteristics was more than about 20% which was evaluated as poor.

It has been confirmed from the results described above that in the case where a conductive metal powder includes Ag, Cu, and Ni, the mass ratio of Ag in the conductive metal powder is about 3.0 wt % or more and about 10.0 wt % or less, the mass ratio of Cu in the conductive metal powder is about {(1−mass ratio of Ag/100)×70} wt % or more and about {(1−mass ratio of Ag/100)×95} wt % or less, and the mass ratio of Ni in the conductive metal powder is about {(1−mass ratio of Ag/100)×5} wt % or more and about {(1−mass ratio of Ag/100)×30} wt % or less, it is possible to obtain a conductive paste having good platability and capable of providing an outer electrode having excellent migration resistance, and by using the conductive paste, it is possible to obtain a multilayer ceramic capacitor having excellent migration resistance and high reliability.

5. Experimental Example 2

Multilayer ceramic capacitors as samples were produced in accordance with the non-limiting example of a method of manufacturing a multilayer ceramic capacitor described above. Experiments were performed on each sample to evaluate the platability of the conductive resin layer made of the conductive paste produced using the materials shown in Table 3, and the migration short circuit time and the rate of change in electrical characteristics of the multilayer ceramic capacitor including the outer electrode including the conductive resin layer.

(a) Sample Used in Experimental Example 2

The specifications of the multilayer ceramic capacitor as the sample used in the Experimental Example are as follows:

Size of multilayer ceramic capacitor (design value): length×width×height=about 1.0 mm×about 0.5 mm×about 0.5 mm Capacitance: about 0.01 μF Rated voltage: about 50 V Material of dielectric layer: $BaTiO_3$ Structure of outer electrode Material of underlying electrode layer: electrode containing conductive metal (Cu) and glass Material of conductive resin layer: refer to Table 1

Plating layer: two-layer structure including Ni plating layer and Sn plating layer The $D_{50}$ of the conductive metal powder included in the conductive paste of the conductive resin layer in each sample was in the range of about 1.5 μm to about 5.5 μm. Furthermore, the specific surface area of the conductive metal powder included in the conductive paste of the conductive resin layer in each sample was about 0.30 wt %·g/m$^2$ or more and about 0.55 wt %·g/m$^2$ or less.

Table 3 shows the mass ratio of the metal component contained in the conductive metal powder, the mass ratio relative to the total of Cu and Ni (100 wt %) in the core particle of a CuNi alloy, and materials of the thermosetting resin in each sample. In the thermosetting resin in each sample, the base resin, the curing agent, the curing accelerator, and the coupling agent are shown. Note that the samples of asterisked sample numbers are within the ranges of preferred embodiments of the present invention.

TABLE 3

| | Metal component | | | | | Thermosetting resin | | | |
|---|---|---|---|---|---|---|---|---|---|
| | Mass ratio in conductive metal (wt %) | | | Mass ratio relative to total of Cu and Ni (100 wt %) in core particle of CuNi alloy (wt %) | | | | | |
| Sample No. | Ag | Cu | Ni | Cu | Ni | Base resin | Curing agent | Curing accelerator | Coupling agent |
| 1 | 100 | — | — | — | — | Epoxy resin | Phenolic resin | Imidazole | Epoxy silane |
| * 7 | 10 | 81.00 | 9.00 | 90 | 10 | Epoxy resin | Phenolic resin | Imidazole | Epoxy silane |
| * 8 | 10 | 63.00 | 27.00 | 70 | 30 | Epoxy resin | Phenolic resin | Imidazole | Epoxy silane |
| * 15 | 5 | 90.25 | 4.75 | 95 | 5 | Epoxy resin | Phenolic resin | Imidazole | Epoxy silane |
| * 9 | 3 | 92.15 | 4.85 | 95 | 5 | Epoxy resin | Phenolic resin | Imidazole | Epoxy silane |
| * 16 | 5 | 85.50 | 9.50 | 90 | 10 | Epoxy resin | Phenolic resin | Imidazole | Epoxy silane |
| * 17 | 3 | 87.30 | 9.70 | 90 | 10 | Epoxy resin | Phenolic resin | Imidazole | Epoxy silane |
| * 18 | 5 | 66.50 | 28.50 | 70 | 30 | Epoxy resin | Phenolic resin | Imidazole | Epoxy silane |
| * 19 | 3 | 67.90 | 29.10 | 70 | 30 | Epoxy resin | Phenolic resin | Imidazole | Epoxy silane |
| 20 | 5 | 52.25 | 42.75 | 55 | 45 | Epoxy resin | Phenolic resin | Imidazole | Epoxy silane |
| 21 | 3 | 53.35 | 43.65 | 55 | 45 | Epoxy resin | Phenolic resin | Imidazole | Epoxy silane |
| 13 | 1 | 89.10 | 9.90 | 90 | 10 | Epoxy resin | Phenolic resin | Imidazole | Epoxy silane |
| 14 | 1 | 69.30 | 29.70 | 70 | 30 | Epoxy resin | Phenolic resin | Imidazole | Epoxy silane |

(b) Evaluation Methods for Characteristics of Each Sample
Measurement of Migration Short Circuit Time The migration short circuit time was measured by a water drop method. Arrow-shaped electrode patterns, which were formed using a conductive paste including a conductive metal powder including the metal component shown in Table 3 and a thermosetting resin, were placed on a substrate such that arrow tips faced each other with a distance of about 4 mm between them. Pure water was dropped onto the arrow-shaped electrode patterns, and by applying a voltage of about 5,000 V/m, migration was allowed to grow between the arrow-shaped electrode patterns. The period of time until a short circuit occurred between the arrow-shaped electrode patterns was measured. Note that in the samples of sample Nos. 13 and 14 and sample Nos. 16 to 21, migration growth stopped even when a predetermined period of time elapsed, and no short circuit occurred. Accordingly, the test was not continued for about 1,200 seconds or more.

Platability

The platability was evaluated by the same method as that in Experimental Example 1.

Evaluation Method for Rate of Change in Electrical Characteristics

The rate of change in electrical characteristics was evaluated by the same method as that in Experimental Example 1.

(c) Results of Characteristics Evaluation on Each Sample

Table 4 shows the migration short circuit time, the platability, and the rate of change in electrical characteristics in each sample. Note that the samples of asterisked sample numbers are within the ranges of preferred embodiments of the present invention.

TABLE 4

| Sample No. | Migration short circuit time (sec) | Platability (%) | Rate of change in electrical characteristics (%) |
|---|---|---|---|
| 1 | 270 | 99.8 | 2.8 |
| * 7 | 347 | 98.2 | 2.7 |
| * 8 | 444 | 97.9 | 4.1 |
| * 15 | 469 | 98.2 | 2.7 |
| * 9 | 530 | 97.8 | 3.2 |
| * 16 | 1200 or more | 98.0 | 2.9 |
| * 17 | 1200 or more | 97.3 | 2.9 |
| * 18 | 1200 or more | 97.5 | 4.3 |
| * 19 | 1200 or more | 97.0 | 5.4 |
| 20 | 1200 or more | 70.1 | 65.0 |
| 21 | 1200 or more | 48.3 | 70.1 |
| 13 | 1200 or more | 94.6 | 28.0 |
| 14 | 1200 or more | 94.0 | 35.0 |

The results of Tables 3 and 4 show that, when migration was evaluated by a strict method as compared with that in Experimental Example 1, in sample Nos. 7 and 8, although within the ranges of preferred embodiments of the present invention, since the mass ratio of Ag in the conductive metal was about 10 wt %, a short circuit due to migration growth occurred, and in sample Nos. 9 and 15, since the mass ratio of Cu relative to the total of Cu and Ni (100 wt %) in the core particle of the CuNi alloy was about 95 wt %, a short circuit due to migration growth occurred.

On the other hand, in sample Nos. 16 to 19, the mass ratio of Ag in the conductive metal was about 3 wt % or more and about 5 wt % or less, the mass ratio of Cu relative to the total of Cu and Ni (100 wt %) in the core particle of the CuNi alloy was about 70 wt % or more and about 90 wt % or less, and the mass ratio of Ni relative to the total of Cu and Ni (100 wt %) in the core particle of the CuNi alloy was about 10 wt % or more and about 30 wt % or less. Therefore, for evaluation of all of the migration short circuit time, the platability, and the rate of change in electrical characteristics, good results were obtained.

Furthermore, in the samples in which the conductive resin layers were formed using the conductive pastes with the mass ratios of the metal component of sample Nos. 20 and 21, which were newly added in Experimental Example 2, the mass ratios of Cu and Ni were outside the ranges of preferred embodiments of the present invention. Therefore, the platability was less than about 90% which was evaluated as poor, and the rate of change in electrical characteristics was more than about 20% which was evaluated as poor.

It has been confirmed from the results described above that in the case where a conductive metal powder includes Ag, Cu, and Ni, the mass ratio of Ag in the conductive metal powder is about 3.0 wt % or more and about 5.0 wt % or less, the mass ratio of Cu in the conductive metal powder is about {(1−mass ratio of Ag/100)×70} wt % or more and about {(1−mass ratio of Ag/100)×90} wt % or less, and the mass ratio of Ni in the conductive metal powder is about {(1−mass ratio of Ag/100)×10} wt % or more and about {(1−mass ratio of Ag/100)×30} wt % or less, it is possible to obtain a conductive paste having good platability and capable of forming an outer electrode having excellent migration resistance, and by using the conductive paste, it is possible to obtain a multilayer ceramic capacitor having excellent migration resistance and high reliability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A conductive paste comprising:
 a conductive metal powder; and
 a curable resin; wherein
 the conductive metal powder primarily includes only Ag and CuNi alloy;
 a mass ratio of the Ag in the conductive metal powder is about 3.0 wt % or more and about 10.0 wt % or less;
 a mass ratio of the Cu in the conductive metal powder is about {(1−mass ratio of Ag/100)×70} wt % or more and about {(1−mass ratio of Ag/100)×95} wt % or less; and
 a mass ratio of the Ni in the conductive metal powder is about {(1−mass ratio of Ag/100)×5} wt % or more and about {(1−mass ratio of Ag/100)×30} wt % or less.

2. The conductive paste according to claim 1, wherein the mass ratio of the Ag in the conductive metal powder is about 3.0 wt % or more and about 5.0 wt % or less.

3. The conductive paste according to claim 1, wherein the mass ratio of the Cu in the conductive metal powder is about {(1−mass ratio of Ag/100)×70} wt % or more and about {(1−mass ratio of Ag/100)×90} wt % or less; and
 the mass ratio of the Ni in the conductive metal powder is about {(1−mass ratio of Ag/100)×10} wt % or more and about {(1−mass ratio of Ag/100)×30} wt % or less.

4. The conductive paste according to claim 1, wherein the CuNi alloy is provided as core particles; and
 a coating layer including the Ag is located on a surface of each of the core particles.

5. The conductive paste according to claim 1, wherein a particle size of the conductive metal powder is about 0.1 μm or more and about 10.0 μm or less.

6. The conductive paste according to claim 1, wherein the curable resin is a thermosetting resin or a photocurable resin.

7. The conductive paste according to claim 6, wherein the thermosetting resin is an epoxy resin or a phenoxy resin.

8. The conductive paste according to claim 1, further comprising a curing agent, a curing accelerator, and a coupling agent.

9. The conductive paste according to claim 8, wherein the curing agent is phenolic resin.

10. The conductive paste according to claim 8, wherein the curing accelerator is an imidazole-based curing accelerator or a tertiary amine-based curing accelerator.

11. The conductive paste according to claim 8, wherein the coupling agent is an epoxy silane.

12. A ceramic electronic component comprising:
 an outer electrode; wherein
 the outer electrode includes a conductive resin layer including a conductive metal;
 the conductive metal primarily includes only Ag and CuNi alloy;
 a mass ratio of the Ag in the conductive metal is about 3.0 wt % or more and about 10.0 wt % or less;
 a mass ratio of the Cu in the conductive metal is about 63 wt % or more and about 92.15 wt % or less; and
 a mass ratio of the Ni in the conductive metal is about 4.5 wt % or more and about 29.1 wt % or less.

13. The ceramic electronic component according to claim 12, wherein the mass ratio of the Ag in the conductive metal is about 3.0 wt % or more and about 5.0 wt % or less.

14. The ceramic electronic component according to claim 12, wherein the mass ratio of the Cu in the conductive metal is about 85.5 wt % or more and about 92.15 wt % or less; and
 the mass ratio of the Ni in the conductive metal is about 9.5 wt % or more and about 29.1 wt % or less.

15. The ceramic electronic component according to claim 12, wherein
 the CuNi alloy is provided as core particles; and
 a coating layer including the Ag is disposed on a surface of each of the core particles.

* * * * *